Aug. 18, 1953   G. M. PELTZ ET AL   2,649,331
DEVICE FOR INTERMITTENTLY DISCHARGING FLUID UNDER PRESSURE
Filed Aug. 9, 1950   4 Sheets-Sheet 1
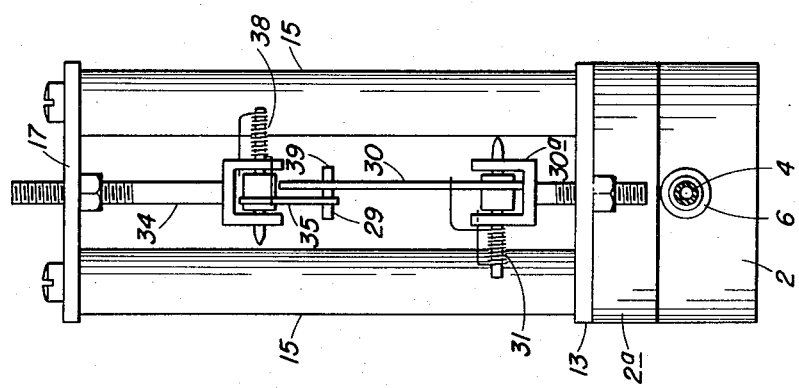
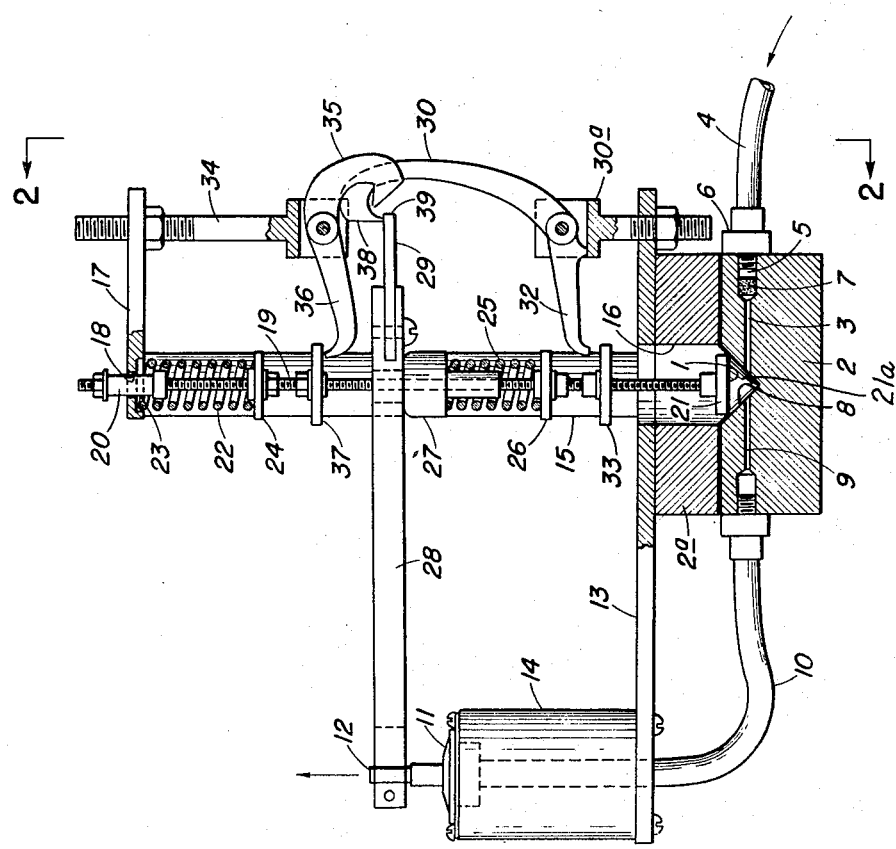
INVENTORS
HENRY BOVIN
GORDON M. PELTZ
BY
Kenyon & Kenyon
ATTORNEYS Aug. 18, 1953  G. M. PELTZ ET AL  2,649,331
DEVICE FOR INTERMITTENTLY DISCHARGING FLUID UNDER PRESSURE
Filed Aug. 9, 1950  4 Sheets-Sheet 2

INVENTORS
HENRY BOVIN
GORDON M. PELTZ
BY
Kenyon & Kenyon
ATTORNEYS

Aug. 18, 1953   G. M. PELTZ ET AL   2,649,331
DEVICE FOR INTERMITTENTLY DISCHARGING FLUID UNDER PRESSURE
Filed Aug. 9, 1950   4 Sheets-Sheet 3
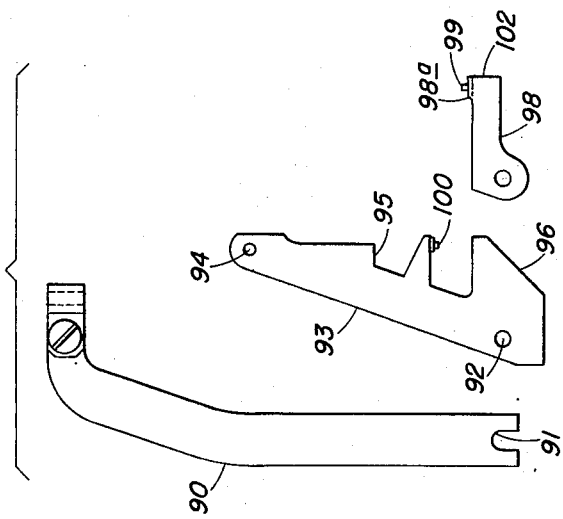
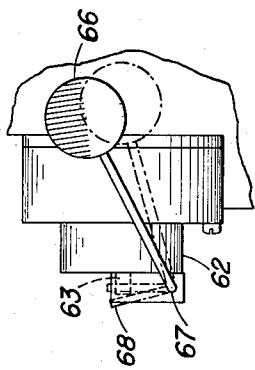
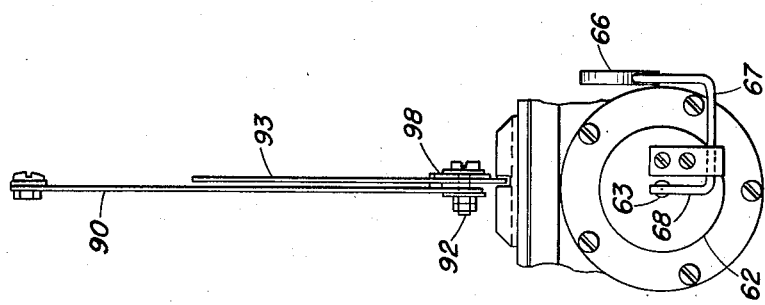
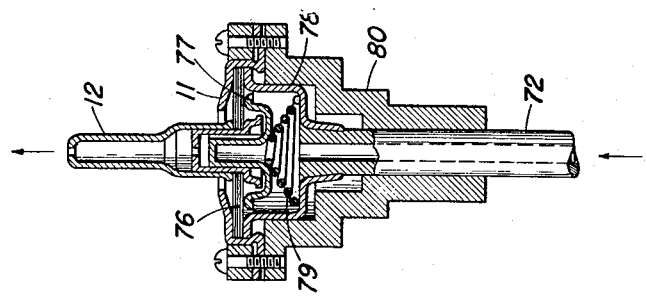
INVENTORS
*HENRY BOVIN*
*GORDON M. PELTZ*
BY
*Kenyon & Kenyon*
ATTORNEYS Aug. 18, 1953  G. M. PELTZ ET AL  2,649,331
DEVICE FOR INTERMITTENTLY DISCHARGING FLUID UNDER PRESSURE
Filed Aug. 9, 1950  4 Sheets-Sheet 4

INVENTORS
HENRY BOVIN
GORDON M. PELTZ
BY
Kenyon & Kenyon
ATTORNEYS

Patented Aug. 18, 1953

2,649,331

UNITED STATES PATENT OFFICE 2,649,331

DEVICE FOR INTERMITTENTLY DISCHARGING FLUID UNDER PRESSURE

Gordon M. Peltz, Flushing, and Henry Bovin, New York, N. Y., assignors to Bridgeport Brass Company, Bridgeport, Conn., a corporation of Connecticut Application August 9, 1950, Serial No. 178,396

2 Claims. (Cl. 299—25)

This invention relates to a device for intermittently discharging fluid under pressure.

The device is particularly intended for use in conjunction with the aerosol spray packages currently in use. Such a package comprises a container equipped with a nozzle controlled by a valve container enclosing liquefied gas in which an active ingredient is dissolved or mixed. The container maintains adequate pressure on the gas to keep it liquid. When the valve is opened the gas boils and ejects a spray. The active ingredient may be a deodorant, disinfectant, insecticide, etc.

Such a package is small enough to be easily picked up manually by the user, and the valve is ordinarily arranged so that the user must open it by the use of finger pressure whenever a spray is desired. Heretofore there has not been any fully satisfactory way to operate the package automatically so as to continuously maintain a desired concentration of the active ingredient in the surrounding atmosphere.

One of the objects of the present invention is to provide a device for effecting an intermittent fluid discharge from such a package, or from any supply of fluid under pressure, in an automatic manner eliminating the need for manual operation. Another object is to provide a device of this character which does not require the installation of electric wiring or other special installation costs. Other objects may be inferred from the following.

Referring to the accompanying drawings:

Fig. 1 is a vertical section of a first example of a device embodying the present invention.

Fig. 2 is an end elevation of the device looking in the direction indicated by the line 2—2 in Fig. 1.

Fig. 5 is a vertical section taken on the line 5—5 in Fig. 3.

Fig. 6 is an end elevation looking in the direction indicated by the line 6—6 in Fig. 3, this view eliminating a number of the parts which are adequately shown by Fig. 4 and which might cause confusion in the present instance.

Fig. 7 is a side elevation of a portion of the device looking in the direction indicated by the line 7—7 in Fig. 4.

Fig. 8 is an exploded view of certain elements shown in Fig. 3.

Figure 4:
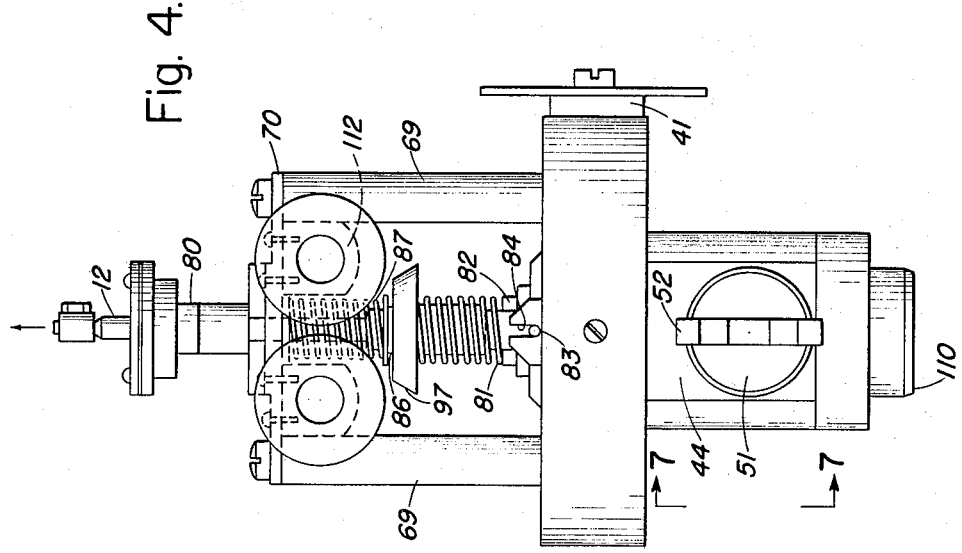
Fig. 4 is an end view of this second example looking in the direction indicated by the line 4—4 in Fig. 3.

In the first example, shown by Figures 1 and 2, a horizontally positioned, reciprocative diaphragm 1 has an enclosure 2 for its bottom side. This enclosure 2 has a fluid inlet duct 3 to which a length of flexible tubing 4 connects. This length of tubing 4 is supplied with the fluid under pressure. For example, the unillustrated end of this tubing 4 may be connected with the nozzle of one of the packages described, with the valve of this package forced to its open position and continuously held, by a lock or the like, against closing.

The enclosure 2 is in the form of a block of material with the inlet 3 formed by a duct through this block. This duct 3 is enlarged at its entrance end, by a counterbore 5, the tubing 4 having an end coupler 6 which is screw threaded into this counterbore. At its inner end this counterbore 5 contains a plug 7 of porous material which functions as a choke for the fluid flowing through the inlet 3. This plug is permeable by the gas carried through the tubing 4, but it permits this gas to seep through only at a very slow rate. The porous material may be the porous stainless steel material which is currently available commercially. This is believed to be made by sintering powdered stainless steel.

The enclosure or block 2 defines a space 8 beneath the diaphragm 1. The effect is that of an expansible and contractible fluid chamber, the diaphragm 1 being able to rise and fall. The diaphragm forms a reciprocative wall for the fluid chamber. A piston and cylinder arrangement might be used, but the diaphragm arrangement shown provides a permanently leak-proof arrangement. Preferably the diaphragm 1 is made of a flexible sheet plastic having a composition that is inert respecting the fluid being handled by the device.

An outlet 9 leads through the block 2 from the space 8 and connects with a length of flexible tubing 10. The connection arrangement is similar to the one described in connection with the tubing 4. However, no choke or other flow restrictive means is used in the outlet 9. Therefore, fluid can flow through this outlet 9 freely as compared to the restricted flow possible through the inlet 3. The tubing 10 leads to a valve assembly including a flange 11 and a nozzle 12 which also operates to open the valve when this nozzle is tilted. The valve is of the normally-closed type. The interior of this assembly includes a spring which biases the valve to its closed position. The details of this valve are disclosed in connection with the second example. The chamber 2 has an upper section 2a which serves to clamp the periphery of the diaphragm 1 to the block 2, and which also serves as a mounting for horizontal base plate 13 to which a tubular column 14 is fastened, the flange 11 of the described valve assembly being fastened to the top of this tubular column 14.

The above mentioned valve, which is subsequently described in detail with the aid of Fig. 5, is disclosed and claimed by an application filed November 10, 1947 by N. O. Loven and J. T. Efford, this application bearing Serial No. 785,158 now Patent No. 2,582,262 dated January 15, 1952. The valve is used as a part of one of the described type of packages now commercially available. In the case of the package, the user operates the valve by manually tilting the nozzle 12, the spray being ejected through the end of this nozzle. Ordinarily the nozzle is covered by a shiftable cap which diverts the spray horizontally, the nozzle being tilted to open the valve by manually shifting the cap.

A pair of laterally spaced vertical columns 15 are fastened on top of the plate 13 so that they straddle a well 16 formed by interregistered holes through the parts 2a and 13. A bridge plate 17 is screwed to the tops of these columns 15 in a horizontal position so as to span between them, and this bridge plate has a vertical hole 18 registering with the top of the diaphragm 1.

The diaphragm 1 is connected with a push rod 19 which extends therefrom up through the hole 18. This rod 19 is screw-threaded for its entire length, and a guide piece 20 is screwed onto its upper end to provide a reciprocative guide working in the hole 18. A clamping nut 21 is screwed onto the lower end of the rod 19 so that its bottom rests on top of the diaphragm 1, and a lower clamping nut 21a, shaped to fit the space 8, is screwed onto the bottom of the rod 19 so that it engages the bottom of the diaphragm and clamps the latter so as to connect it with the rod. The rod 19 reciprocates vertically with vertical reciprocation of the diaphragm 1.

A helical coil, compression spring 22 encircles the rod 19 beneath the plate 17, the latter having a recess 23 in its bottom face forming a seat for the upper end of this spring 22. The push rod 19 has an opposing spring seat 24, for the lower end of the spring 22, screwed to it, the spring 22 being compressed between these two seats. This spring 22 functions to elastically bias the diaphragm 1 downwardly at all times. This arrangement causes the space 8 and the diaphragm 1 to define an expansible and collapsible chamber which is continuously biased to contract. The spring 22 provides the biasing force in this instance.

A second helical coil, compression spring 25 encircles the rod 19 below the spring 22, a spring seat 26 being screwed onto the rod 19 so that it engages the bottom end of this spring 25. A second spring seat 27 engages the top end of the spring 25, this seat 27 being free to reciprocate relative to the shaft 19. A long lever 28 has one end securely fastened to the nozzle 12, and its other end rests on and extends beyond the upper spring seat 27 of the spring 25. The seat 27 functions as a follower for the top of the spring 25. When the spring seat 27 moves upwardly it swings the lever 28 upwardly to tilt the nozzle 12 to the left and thus open the valve. The lower spring seat 26, of the spring 25, is positioned so that when the diaphragm 1 and push rod 19 are at their lowermost positions, when the chamber is fully contracted, the spring 25 is unstrained and the upper spring seat 27 holds the lever 28 so that it does not tilt the valve assembly's nozzle 12.

The extending, swinging end of the lever 28 has a latch piece 29 projecting therefrom. This latch piece is engaged by the working end of a latch 30 when the diaphragm 1, push rod 19 and lever 28, are at their lowermost positions. The latch 30 is in the nature of a swinging latch arm which is biased to swing toward the latch piece 29 by a spring 31. The swinging latch arm 30 is pivoted by an upstanding bracket arm 30a fastened to the plate 13. The described latch is in the nature of a bell-crank, one arm of which forms the latch arm 31 while the other arm forms a release finger 32. This release finger 32 extends to a location adjacent the push rod 19 beneath the spring seat 26. A release driver 33 is screwed onto the shaft 19 below the seat 26 and is adjusted so that when the diaphragm 1 and rod 19 move upwardly a predetermined distance, fixed by the location of the driver 33 on the rod 19, the release arm 32 is swung upwardly so that the latch arm 30 is swung outwardly with consequent release of the latch piece 29. The arm 32 functions as a feeler for operating the latch, while the driver 33 works as an operator for this feeler.

A depending bracket arm 34 is screw threaded to a transversely extending portion of the bridge plate 17. This bracket arm 34 pivotally supports, by its lower end, a second swinging latch arm 35 which latches with the latch piece 29 when the lever 28 is swung to an uppermost position, which is predetermined by adjusting the bracket arm 34 up or down. This latch arm 35 also has a release arm 36, and a release arm driver 37 is screwed onto the rod 19 beneath the lower spring seat 24 of the upper spring 22. This latch arm 35 is biased to latching position by a spring 38 so that it latches automatically when the lever 28 swings upwardly. Downward motion of the rod 19 and release driver 37 operates the release arm 36 so as to effect unlatching.

After the latch arm 30 is unlatched, it is held in an unlatched position against the bias of the spring 31. This is done by forming a flat face 38, on the end of the latch arm 30, so that it faces the end edge 39 of the latch piece 29. Upon unlatching of the latch 30, the latch piece 29 moves upwardly with the faces 38 and 39 interengaging so as to hold out the latch arm 30. The straight vertical face 38 permits relative movement between the latch piece 29 and the latch arm 30 while such holding is going on.

The operation of this first example, shown by Figures 1 and 2, is as follows:

Assuming that the tubing 4 is connected to the nozzle of one of the packages and that the valve of this package is open, there is a continuous supply of fluid under pressure in the tubing 4. This fluid slowly seeps through the choke 7 and fills the various spaces to which it then gains access. Therefore, fluid pressure gradually develops in the space 8, this gradually causing the diaphragm to lift with consequent lifting of the rod 19. Fluid cannot escape through the nozzle 12 during this lifting action because the latch arm 30 is holding down the latch piece 29, thus preventing lifting of the arm 28.

As the lifting action proceeds, more strain is put into the spring 22 and strain is put in the spring 25, as the springs contract under the force of the fluid pressure beneath the diaphragm 1. Ultimately, the driver 33 engages and pushes upwardly the latch release arm 32, and this swings the latch arm 30 outwardly so as to unlatch the latch piece 29, the lever 28 then being snapped upwardly by the force, from the fluid pressure in the space 8, that has become stored in the spring 25. Thus the nozzle 12 is suddenly snapped to a tilted position so as to open the valve on top of the valve assembly column 14. The spring 25 is stronger than the spring biasing the nozzle 12 against tilting.

Since the fluid can now escape, the force stored in the spring 22, also received from the pressure in the space 8, drives the diaphragm 1 downwardly so as to discharge the fluid, through the outlet 9, under the pressure available in this spring 22. The discharge occurs through the nozzle 12 through this pressure developed by the force from the spring 22. During the discharge, the surfaces 38 and 39 coact, while the nozzle 12 is held properly tilted by the latch arm 35 which immediately engages the latch piece 29 when the latter is driven to its uppermost position by the snap action of the spring 25. Thus the valve nozzle 12 remains fully tilted during the discharge phase. At the end of this cycle, the driver 37 depresses the latch release arm 36 so as to swing out the latch arm 35 and permit the spring bias, applied by the valve assembly to the tilting nozzle 12, to snap the valve closed. The weight of the lever 28 aids in this effect, the lever snapping downwardly so that it again rests on top of the spring seat 27, the latch arm 35 immediately relatching due to disengagement of the two surfaces 38 and 39. When the push rod 19 descended, the spring seat 27 descended with it while leaving the lever 28 in its upwardly latched position, and when the latch 35 unlatches this spring seat 27 has reached its lowermost position so that the latch 30 may promptly latch with the piece 29.

Fluid continues to seep through the choke 7 during this discharging action. However, its rate of flow, through the duct 3 is so slow, as compared to the rate the fluid can flow through the passages 9, 10 and 12 that the major amount of the discharging force is applied to the fluid by the spring 22. For example, the choke 7 may be made of material through which the fluid can flow at a rate so slow that two or more minutes are required to raise the diaphragm 1 to its uppermost position during the intake cycle, whereas the discharge cycle may require a time period of only about one second.

The second example of the invention, illustrated by Figures 3 through 8, represents an improvement of the first example. The latter is designed so that all of the parts may be adjusted, so it is well suited for use for determining the spring action, cycle timing and other design factors. In this second example, the design is more in the nature of a production device which is more adapted for commercial use.

Figure 9:
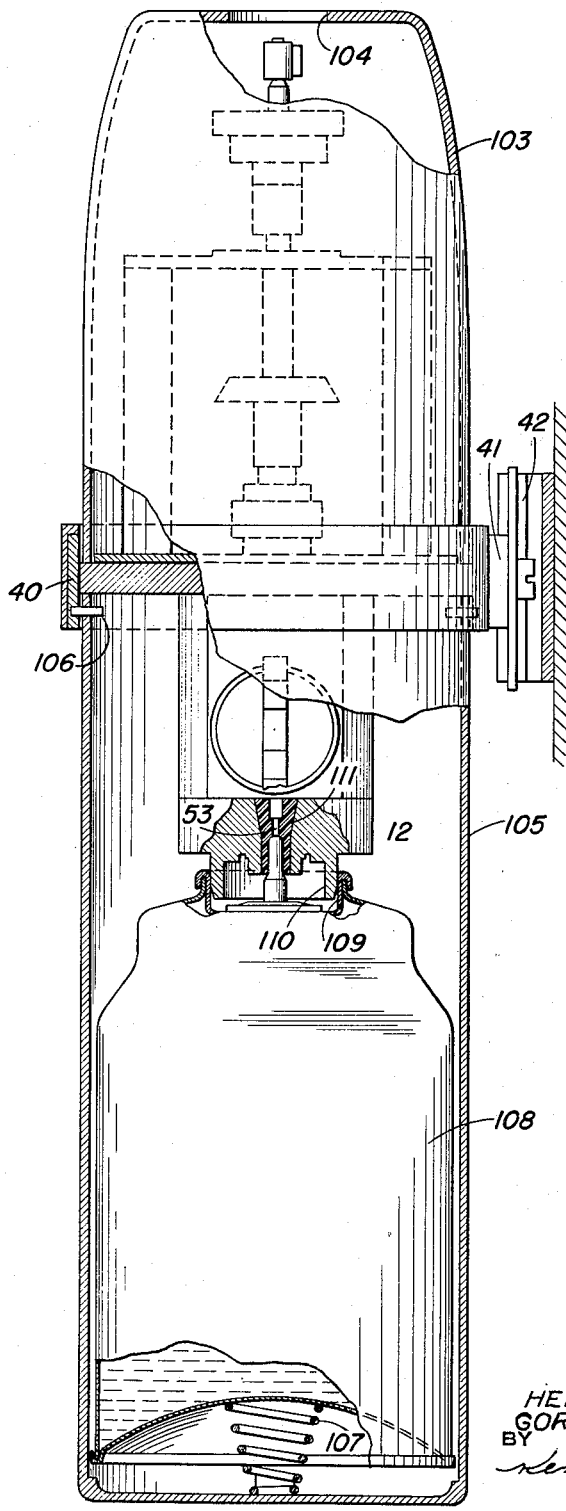
Fig. 9 shows the second example in a housing which also serves to mount one of the described packages.

This second example is in the form of a compact device adapted to be secured to the wall of a public washroom or the like. Therefore, as shown by Fig. 9, it embodies a supporting ring 40 provided with a bracket member 41 which may be associated with a wall bracket 42 so that the ring 40 is mounted horizontally.

Figure 3:
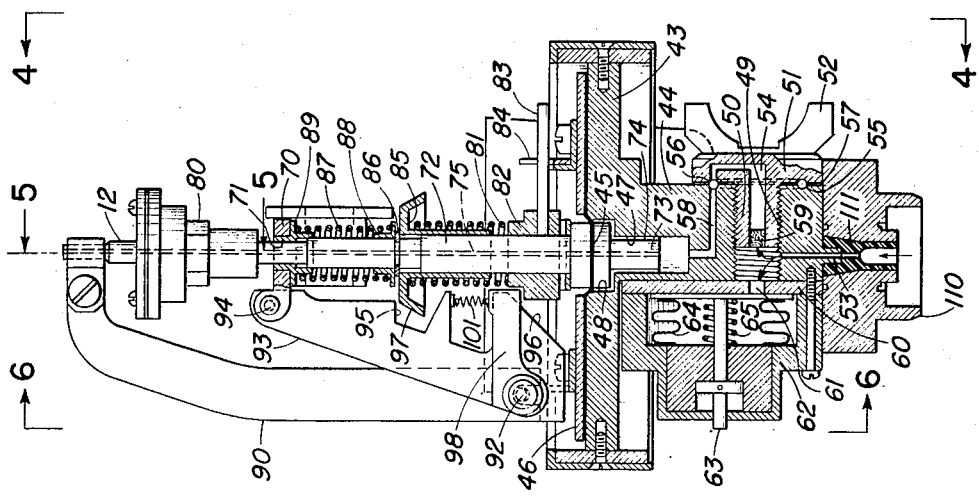
Fig. 3 is a vertical section of a second example of a device incorporating the present invention.

As shown by Fig. 3, this ring 40 internally mounts horizontally a circular plate 43 from which a shank 44 integrally depends. A vertically reciprocative diaphragm 45 is fastened to the top of the plate 43 by a washer 46 which is screw-fastened to the top of the plate 43 and which engages the periphery of the diaphragm 45. A recess 47 extends vertically down through the plate 43 and into the shank 44, beneath the reciprocating portion of the diaphragm 45, the mouth of this bore 47 being enlarged by a countersink 48. The recesses 47 and 48 form a chamber beneath the diaphragm 45 so as to provide the contractible and expansible chamber effect.

A horizontal, internally threaded hole 49 is formed through the shank 44 beneath the bottom of the bore 47, and a cartridge has a threaded shank 50, removably screwed into this hole 49, and a flange-like head 51 externally provided with wings 52 so that the carridge may be screwed into and removed from the hole 49, by using the fingers. A duct 53 is formed vertically up through the bottom of the shank 44 so that it intersects the hole 49 beyond the end of the cartridge shank 50, and this cartridge is formed with a passage 54 which extends axially through the shank, radially through the head 51 and then turns inwardly so as to open beneath the inner face of the head 51. This inner face has a circular recess 55 into which the passage 54 opens. The adjacent outside of the block 44 has a corresponding circular recess 56, and a gasket 57 is arranged between the interfacing surfaces of the block 44 and thei nside of the head 51. This gasket 57 has holes formed through it which register with the recesses 55 and 56. The shank 44 has a horizontal duct 58 formed through it above the hole 49 and which leads from the recess 56 to the bottom of the bore hole 47.

A flow choke plug 59 is installed in the passage 54 of the described removable cartridge. By providing a plurality of these cartridges, which duplicate each other excepting that the flow choke plug 59 provides for different flow rates, it is possible for the user to vary the discharge timing in the case of this second example.

As shown by Fig. 3, a vertical plate 60 is mounted on the opposite side of the shank 44. This plate 60 has a hole 61 which registers with the opposite end of the hole 50, in the other end of which the previouly described cartridge is mounted. A housing 62 is fastened to the outside of this plate 61 to form an enclosure for this end of the hole 49 which is not closed by the cartridge. A push rod 63 is recprocatively arranged through the end of this housing 62, and the inside of the end of this housing has a bellows 64 fastened to it in a fluid-tight manner with a closed end working against the inner end of the push rod 63. A spring 65 biases this push rod 63 and the closed end of the bellows 64 inwardly. This arrangement provides for permanent fluid tightness respecting the inner end of the hole 49.

With the above construction, when fluid pressure exists in the hole 50, on the supply side of the choke 59, the push rod 63 is thrust outwardly, and when there is no fluid pressure the push rod 63 is returned inwardly. The duct 53, the passage 54 and the duct 58 provide the inlet for the space beneath the diaphragm 45. As is subsequently explained, the duct 53 connects with one of the described types of packages so as to receive pressure therefrom as long as the package contains fluid under pressure. When the package empties the fluid pressure falls. Consequently, the push rod 63 provides an indication of whether or not the package has become exhausted. The indicating pressure is taken from the side of the choke plug 59 that is toward the supply of fluid under pressure. Thus the indication is obtained regardless of fluctuations in the pressure on the other side of the element 59.

An indicator arrangement is shown in Figures 6 and 7. This comprises a metal flag 66 having a turning shaft 67 pivotally supported on the outside of the housing 62, this shaft having a bent end 68 which is engaged by the outer end of the push rod 63. This arrangement is such that the flag goes up and down depending on the pressure in the hole 49.

Laterally spaced, vertical columns 69 are fastened to the top of the plate 43, and a horizontal bridge 70 is fastened to the tops of these columns so as to span between them. This bridge 70 has a hole 71 in which the upper end of a vertically reciprocating push rod 72 is journaled. The lower end of this push rod 72 is fastened to the diaphragm 45 and extends through it in a fluid-tight manner so as to provide an end 73 which fits the bore hole 47 and is guided thereby. Thus, in this instance, the push rod 72 is reciprocatively guided at both its top and bottom ends so that the diaphragm 45 is relieved from all of the guiding stress. The end 73 has a vertical groove 74 through which the fluid can travel to the space provided by the countersink 48.

This rod 72 contains a longitudinally extending duct 75 which runs from its bottom to its upper end, and its latter end mounts the previously mentioned valve assembly shown by Fig. 5. As used by both examples, this valve assembly has a flexible diaphragm 76 and beneath the latter the nozzle has an inverted cup-like base 77 the inside of which communicates with the inside of the nozzle through various metering and expansion passageways and chambers. A larger inverted cup 78 is fastened to the bottom of the diaphragm 76 by the flange 11, and this cup 78 houses a spiral compression spring 79 which pushes upwardly on the inverted cup 77 so as to press the peripheral edge of the latter against the diaphragm 76. When the nozzle 12 is tilted, the cup 77 tilts so that its peripheral edge leaves the bottom of the diaphragm 76 and provides an opening. The valve is of the normally-closed type. The spring 79 spring biases the valve part 77 to a closed position at all times. The inverted cup 78 connects in a fluid-tight manner to the top of the rod 72, the latter mounting a housing 80 which supports the flange 11 and contains the depending parts of the valve assembly. Thus, this assembly rises and falls with the rod 72.

A helical coil, compression spring 81 encircles the rod 72 above the diaphragm 45. The spring 81 is much stronger than the valve spring 79. The bottom end of this spring 81 rests on a spring seat 82 fastened to the rod 72. A pin 83 projects horizontally from this seat 82 and rides up and down in a vertical guideway 84. This is to prevent any twisting action by the rod such as might twist the diaphragm 45. The top end of the spring 81 is engaged by a spring seat 85 which is reciprocative relative to the rod 72 and is pushed upwardly by this spring 81 against a snap ring 86 which is snapped into an annular groove formed in the rod 72. This snap ring forms an anchor.

A second helical compression spring 87 encircles the rod 72 above the snap ring 86, the latter upwardly holding a spring seat 88 for the bottom end of this second spring. The top end of this spring 87 is engaged by a spring seat 89 restrained by the bridge 70 and which, as is illustrated, forms a bushing for the portion of the reciprocating rod 72 which works through the hole 71 in the bridge 70.

The nozzle 12 of the valve assembly, on top of the rod 72, is rigidly engaged by the upper end of a generally vertical lever 90 which offsets from this nozzle and then depends to a lowermost end which is provided with a vertical slot 91. This slot 91 rides around a horizontal pin 92 which is carried by the lower end of a second lever 93 which slants upwardly to the bridge 70 to which its upper end is connected by a pivot pin 94. This lever 93 is formed to provide a latch 95 which latches against the top of the spring seat 85 to hold the latter from rising with the rod 72 when the fluid pressure builds up and lifts this rod. This latch is released by the lower end of the lever 93 having a cam surface 96 which is engaged by the top of the spring seat 83 as the latter rises, this action swinging out the lever 93 so as to release the latch surface 95 from the top of the spring seat 85. This camming motion may swing the lever 90 slightly but not enough to tilt the valve nozzle 12 enough to open the valve.

As the rod 72 rises the spring 81 compresses, and, upon releasing the latch 95, the resulting spring force snaps up the spring seat 85 to the snap ring 86 which has risen with the rod 72. The top of the spring seat 85 has a cam surface 97 which engages the tip of the latch surface 95, when the latter unlatches, and snaps out the lever 93 so as to swing out the lever 90 and tilt the nozzle 12 with a snap action. This lever 90 rises with the rod 72, the slot 91 permitting this vertical motion without affecting the lever 93.

It is to be noted that the cam action on the surface 96 works through a long lever arm length, whereas the cam action on the latch 95 works through a much shorter lever arm length. Therefore, the lever system does not swing much with the first-mentioned cam action, but does swing enough to tilt the valve nozzle 12 adequately, when the second-mentioned cam action occurs.

The spring 87 constantly biases the diaphragm 45 downwardly to contract the space beneath it. Therefore, as soon as the nozzle 12 is tilted to open the discharge valve, the force from this spring 87 drives out the fluid beneath the bottom of the diaphragm. The fluid outlet flow, from the chamber, is through the duct 75 and through the valve assembly on top of the rod 72.

In this instance the valve nozzle 12 is kept tilted, to permit a full discharge cycle, by a generally horizontal latch lever 98 having laterally spaced arms which extend so as to embrace the lever 93 and which are pivoted by the pivot pin 92. This latch arm has a bridge 98a at one end which overlies the part providing the cam surface 96 of the lever 93. A small stud 99 projects upwardly from this bridge 98a, and the lever 93 has an arm portion providing a downwardly pointing stud 100 opposing the stud 99. A helical coil, compression spring 101 is retained between these studs 99 and 100, whereby this spring 101 continuously biases the latch arm 98 downwardly. This latch arm 98 has a front face 102 which engages the side of the spring seat 82 when the lever 90 is swung outwardly and this spring seat 82 is at any raised position from its lowermost position. Therefore, the lever 90 is cocked outwardly and held until the diaphragm 45 is fully contracted by the downward driving action of the spring 87. Once the diaphragm reaches its lowermost position, the side of the spring seat 82 releases the latch arm 98 so that the lever arm 90 is snapped inwardly by the spring bias on the valve nozzle 12 aided by the weight of the lever arm 90. As the rod 72 descends the cam surface 97 clears the latch surface 95 on the slanting lever 93 so there is nothing to interfere with the lever 90 snapping inwardly upon unlatching action of the latching surface 102 respecting the side of the spring seat 82.

Referring now to Fig. 9, the inside of the ring 40 serves to mount an upper casing 103 which is shaped to house all of the parts above the plate 43. This casing is of a generally tubular shape with a closed upper end, this end having an opening 104 through which the discharged fluid is ejected vertically.

A tubular casing 105 fits inside the ring 40 beneath the plate 43, this lower casing being positioned by a bayonet joint of which the pins 106 can be seen in Fig. 9. The bottom of this casing contains a coil compression spring 107, and the casing 105 is proportioned so that an aerosol spray package 108, of a commercially available type, fits inside the casing on top of the spring 107 with the latter pushing the package 108 upwardly toward the shank 44 which depends from the plate 43.

The upper end of the illustrated package 108 has a depression 109 surrounding a valve assembly such as is illustrated by Fig. 5. The lower end of the shank 44 is provided with a depending tubular stud 110 which fits inside this recess 109 so as to positively position the package 108. The spring 107 pushes the package 108 upwardly. The passage 53 which extends downwardly terminates inside this tubular stud 110 and is provided with an elastic nipple 111 which fits tightly around the nozzle 12 of the package's valve. The spring 107 pushes the nozzle 12 against this nipple and causes the inverted cup 77 to leave the diaphragm 76 of the valve assembly. In this fashion, the valve of the package 108 is locked open and the passage 53 is continuously applied with fluid under pressure from the package.

The casing 105 may be provided with an opening through which the indicator flag 66 may be observed. As shown by Fig. 4, the bridge 70 may be provided with brackets 112 for holding a pair of the previously described cartridges. Thus, the casing 105 encloses three of the cartridges including the one in use and, therefore, can provide for three different timings of the intermittent discharge effected by the device.

The operation of this second example is substantially like the operation of the first example which has already been described. The differences, resulting from the different mode of construction, have already been described in connection with describing the details of this second example. Therefore, it is unnecessary to provide a step by step description of the operation of this second example.

In this second example the part 73 is shaped so as to substantially fill the space 48 beneath the diaphragm when the latter is contracted. This is similar to the corresponding arrangement of the first example. In both instances the purpose is to obtain substantially complete expulsion of the fluid when the diaphragm is fully contracted.

We claim:

1. A device for intermittently discharging fluid from a supply of fluid under pressure, said device including, in combination, a fluid chamber having a reciprocative wall, said chamber having a fluid discharge outlet and a fluid inlet for connection with said source and which provides more resistance to fluid flow than does said outlet, a valve controlling said outlet, a spring applying closing force to said valve, a second spring continuously biasing said wall to contract and receiving and storing the wall's expansion, a third spring having one portion moving with said wall and a second portion and a third portion therebetween which receives and stores said wall's expansion force when this second portion is held against moving with said wall, a latch for holding said second portion against so moving, a release for said latch and which is operated by a predetermined amount of expansion motion of said wall, means transmitting the released force from said third spring to said valve to force it open against the closing force of the first-named spring, said third spring being stronger than said first spring, a second latch for holding said valve open as said second spring contracts said wall, and a release for said second latch and which is operated by a predetermined amount of contracting motion of said wall.

2. A device for intermittently discharging fluid from a supply of fluid under pressure, said device including, in combination, a reciprocative diaphragm, an enclosure for one side of said diaphragm and which has a fluid inlet for connection with said supply and a fluid outlet, a fluid flow choke in said inlet, a rod extending from the outer side of said diaphragm and reciprocating therewith, a coil spring encircling said rod and having one end fastened thereto, means for anchoring the other end of said spring with the latter strained so as to push said rod inwardly towards said diaphragm and bias the latter inwardly respecting said enclosure, a second coil spring encircling said rod and having one end fastened thereto, a follower connecting with the other end of said second spring and which is reciprocative in the direction of said rod, a latch engaging and holding said follower when said rod has pushed said diaphragm to an innermost position and holding said follower as said rod is pushed outward by said diaphragm and thus straining said second spring, a release for said latch and which has an operating feeler adjacent to said rod, a feeler operator connecting with and moving with said rod and positioned to operate said feeler when said rod is pushed outwardly to an outermost position so that said latch then releases said follower, a spring-closed valve controlling said outlet and having a tilting piece which opens said valve when tilted, a lever interconnecting said piece and said follower so that motion of said follower by said second spring when said latch is released swings said lever to tilt said piece and open said valve, a second latch for holding said lever when it is swung to a position tilting said valve piece, and an element connecting with and moving with said rod and which releases said second latch when said rod is pushed by said first spring to said innermost position.

GORDON M. PELTZ.
HENRY BOVIN.

References Cited in the file of this patent

UNITED STATES PATENTS

| Number | Name | Date |
|---|---|---|
| 441,078 | Upward | Nov. 18, 1890 |
| 553,077 | Shiels | Jan. 14, 1896 |
| 1,796,941 | Pottinger, Jr. | Mar. 17, 1931 |
| 2,153,432 | Reich | Apr. 4, 1939 |

FOREIGN PATENTS

| Number | Country | Date |
|---|---|---|
| 923,219 | France | Feb. 17, 1947 |